United States Patent [19]

Evans

[11] Patent Number: 4,986,383

[45] Date of Patent: Jan. 22, 1991

[54] VEHICLE BRAKING SYSTEM FOR CONVERTING AND STORING THE MOMENTUM OF A VEHICLE AND USING THE STORED ENERGY TO RE-ACCELERATE THE VEHICLE

[76] Inventor: Kenneth W. Evans, 561 Billow Dr., San Diego, Calif. 92114

[21] Appl. No.: 946,959

[22] Filed: Dec. 29, 1986

[51] Int. Cl.$^5$ .................... B60K 6/00; F15B 1/02
[52] U.S. Cl. ................................ 180/165; 60/371; 60/414; 60/418
[58] Field of Search ............... 180/165, 2.1; 280/212, 280/216; 60/413, 414, 417, 445, 371, 418

[56] References Cited

U.S. PATENT DOCUMENTS

| | | | |
|---|---|---|---|
| 2,755,898 | 7/1956 | Bell | 60/414 X |
| 3,910,043 | 10/1975 | Clerk | 60/413 |
| 4,064,694 | 12/1977 | Baudoin | 60/413 |
| 4,132,283 | 1/1979 | McCurry | 180/165 |
| 4,227,587 | 10/1980 | Carman | 180/165 |
| 4,278,403 | 7/1981 | Shafer | 60/418 X |
| 4,351,409 | 9/1982 | Malik | 180/165 |
| 4,441,573 | 4/1984 | Carman | 180/165 |
| 4,495,768 | 1/1985 | Valavaara | 60/414 |

FOREIGN PATENT DOCUMENTS 147947 9/1982 Japan ..................... 180/165

*Primary Examiner*—Mitchell J. Hill
*Attorney, Agent, or Firm*—Thomas J. Tighe

[57] ABSTRACT

A variable displacement, hydraulic pump/motor has its rotatable cylinder block concentrically affixed to a drive shaft segment of a self-propelled vehicle, the pump/motor has selected pump and motor modes. An hydraulic accumulator is charged and discharged from the pump/motor when it is in its pump and motor modes, respectively. A fluid reservoir supplies and receives low pressure fluid when the accumulator is being charged and discharged, respectively. Preferably the reservoir is a combination of an aft chamber of the accumulator, a low pressure chamber defined by the pump/motor cylinder block and its housing, and a low pressure fluid path between the two. The pump/motor is unloaded when the vehicle is being operated in reverse or when neither the brake nor accelerator is being actuated. The pump/motor is in the pump mode whenever the vehicle is moving forward and the brakes are applied, and it is the motor mode whenever the vehicle is in forward gear and the accelerator is actuated. The mode of the pump/motor is controlled by a pair of complimentary actuators in a push-pull arrangement which operates a lever connected to a variable pitch yoke and swash plate which set the displacement of pump/motor pistons.

12 Claims, 7 Drawing Sheets

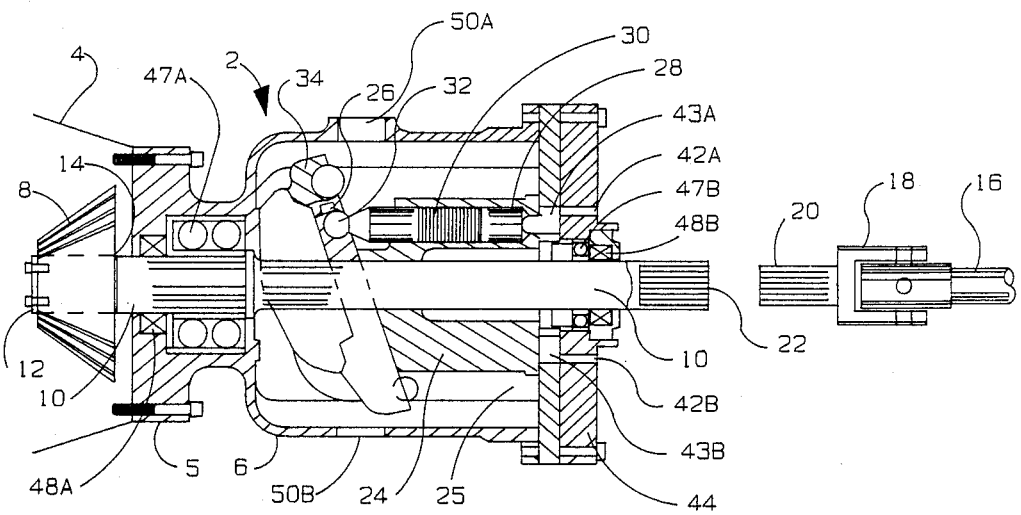
FIG. 1
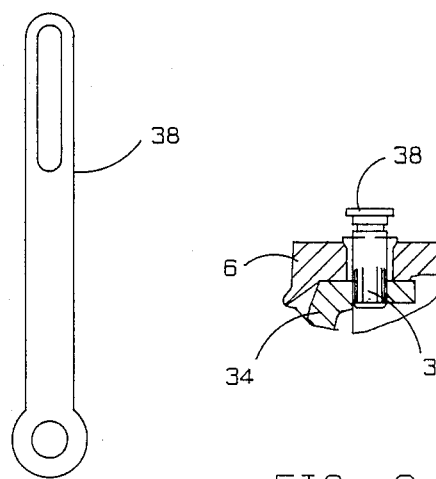
FIG. 2A
FIG. 2
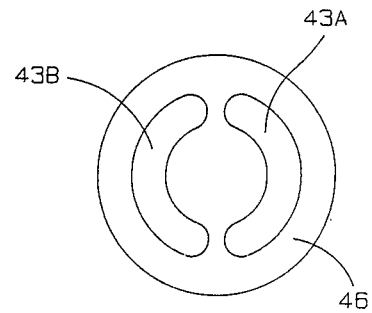
FIG. 1A

VEHICLE BRAKING SYSTEM FOR CONVERTING AND STORING THE MOMENTUM OF A VEHICLE AND USING THE STORED ENERGY TO RE-ACCELERATE THE VEHICLE

BACKGROUND OF THE INVENTION

This invention relates in general to systems which can cause a ground moving vehicle to lose momentum, can convert the momentum to potential energy, and can use that potential energy to re-accelerate the vehicle, and in particular to such systems which embody or work in conjunction with the braking system of the vehicle.

The prior art presents a wide variety of vehicular systems designed to capture and accumulate at least a portion of the momentum lost to a decelerating vehicle, and to use the accumulated energy to re-accelerate the vehicle. Except for flywheel systems, they all utilize various converters which in most cases convert the torque of a drive shaft somewhere between the prime mover (usually an internal combustion engine) and the axle of the vehicle drive wheels. This invention presents a novel and unique system of converting the torque to hydraulic pressure and then reconverting the pressure back to a positive moment to assist in the re-acceleration of the vehicle.

U.S. Pat. No. 3,892,283 by Johnson shows such a system which completely replaces the conventional drive train of a vehicle, including the power transmission. It discloses a variable displacement hydraulic pump/motor (p/m) with an output shaft differentially coupled to the axle of the drive wheels of a vehicle. The p/m is powered by an hydraulic pump driven by an engine or a pressurized hydraulic accumulator or both. The accumulator is charged by the pump during forward or idle conditions and by the p/m during braking. The rotation of the engine is entirely converted to hydraulic pressure, there is no solid state linkage to the differential drive shaft.

U.S. Pat. No. 3,910,043 by Clerk shows another system where the conventional drive train has been replaced by an all hydraulic system. In one embodiment, a single p/m drives the wheels through an output shaft and a conventional differential, and in a second embodiment the shaft and differential replaced by an all hydraulic transaxle comprising two p/ms. An internal combustion engine drives an hydraulic pump which powers the drive wheel p/m and also charges a flywheel accumulator. The accumulator incorporates a second hydraulic pump. The accumulator can drive the drive wheel p/m and conversely the drive wheels p/m can charge the accumulator during braking of the vehicle.

U.S. Pat. Nos. 4,227,587 and 4,350,220 by Carman show other all hydraulic systems. In both, a fixed displacement hydraulic p/m is coupled to the drive wheel axis of a vehicle. The axle p/m is powered by an hydraulic accumulator or an engine coupled p/m if the engine is running. The engine p/m is drivingly coupled to the engine and operates in pump mode when the engine is running and in motor mode to start the engine. When braking the axle p/m acts as a pump to pressurize the accumulator.

U.S. Pat. No. 4,132,283 by McCurry shows an hydraulic pump drivenly engaged by a clutch and gear means to an internal combustion engine crankshaft only when the vehicle is braking and the engine speed is above idle speed. The pump pressurizes an accumulator. An hydraulic motor is powered by the accumulator and is drivenly engaged by a clutch and gear means to the drive shaft abaft the transmission only when the vehicle is accelerating and the accumulator pressure is above a certain threshhold.

U.S. Pat. No. 4,351,409 by Malik shows a p/m selectively engaged by clutch, chain and sprocket means with an extension of an engine crankshaft forward of a conventional power transmission. An hydraulic pressure accumulator can be charged either by braking action or by the engine. The p/m unit is adapted to start the engine and supply drive to the wheels through the transmission.

U.S Pat. No. 4,441,573 by Carman et al. shows a variable displacement p/m used primarily for starting the engine, which is selectively engaged by clutch, sprocket and chains means with a clutched extension of an engine's crankshaft. Abaft the first p/m is a second p/m selectively engaged by clutch, sprocket and chain means to a one-way-clutched shaft which is a further extention of the engine's crankshaft. Abaft both p/ms is a torque converter (transmission).

All such prior devices and systems are cost prohibitive and cannot cost-effectively be installed in vehicles already manufactured. The reason for this is that the controls devised for such systems and devices are complicated, and the bulk and number of items needed is excessive. This invention presents a system which can be retrofitted onto an existing vehicle.

Other advantages and attributes of this invention will be readily discernible by the reading of the text hereinafter.

SUMMARY OF THE INVENTION

This invention presents a rotating cylinder block of a variable displacement p/m coaxially affixed to a segment of a drive shaft between the transmission and the differential, preferably mounted to the differential, and a combination fluid reservoir-pressure cylinder. Auxiliary components are the valves and hoses for the hydraulic system and a simple hydraulic-mechanical means to operate the hydraulic motor by operation of the gas and brake pedals. The variable displacement p/m has a swash plate. When the swash plate is at zero angle, the pistons of the p/m are not reciprocating with respect to the cylinder block and the p/m is neither pumping nor motoring. The swash plate is seated in a yoke. The angle of the swash plate is controlled by a lever affixed to a yoke pintle means. The lever is reciprocatingly linked to the vehicle accelerator pedal and brake pedal. When braking, the p/m becomes a pump which charges a pressure accumulator in a closed-loop arrangement, that is, there is no conventional fluid reservoir. When accelerating the pressure accumulator powers the p/m which then acts as a motor driving the drive shaft. Various check valves are disposed in a single fluid manifold. The system includes an hydraulic shock absorber and a heat exchanger.

An object of this invention is to provide an energy conservation system which can be easily retrofittable on existing ground moving vehicles.

A further object of this invention is to provide an hydraulic energy conservation system which utilizes only one hydraulic pump/motor.

Other objects of this invention will be readily discernible upon the reading of the text hereinafter.

BRIEF DESCRIPTION OF THE DRAWINGS

FIG. 1 is a partial section of an hydraulic pump/motor.

FIG. 1A is a plan view of an inlet/outlet plate.

FIG. 2 is a partial section of the pump/motor of FIG. 1 showing a yoke pintle.

FIG. 2A is a plan view of a lever.

DESCRIPTION OF THE PREFERRED EMBODIMENT

Figure 6:
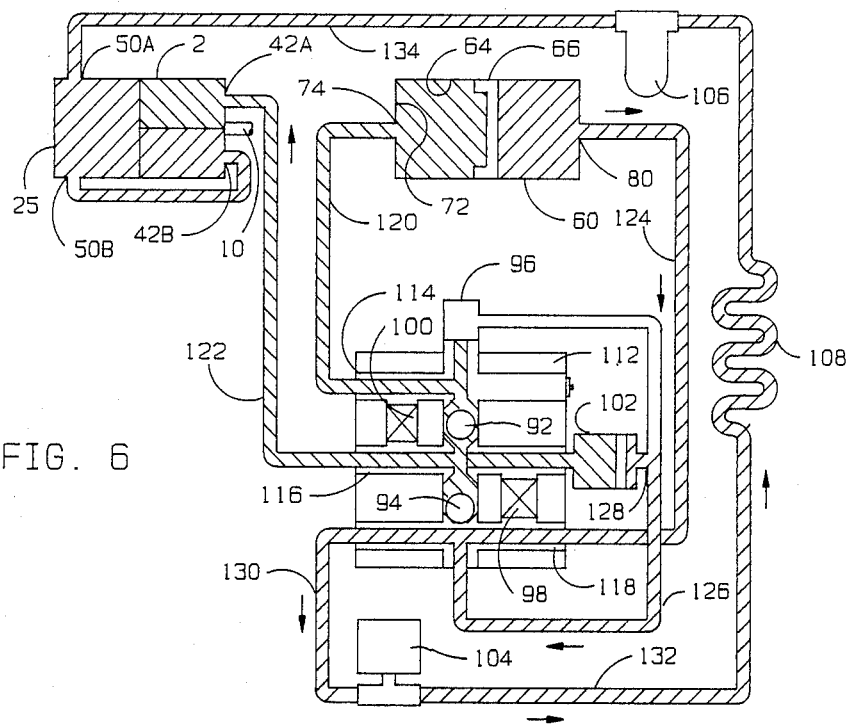
FIGS. 6–10 are diagrammatical views of the hydraulics of this invention showing modes under which it operates.

FIGS. 1, 1A, 2 and 2A depict a typical reversible, variable displacement hydraulic pump/motor 2 (p/m) directly mounted to a standard automotive differential 4 by way of a flange 5 integral with a bell-shaped housing 6. The differential input pinion gear 8 is mounted on the differential end of a p/m rotor shaft 10 by a plate 12 and shimmed 14 for gear back-lash. The drive shaft 16 from the transmission (not shown) has affixed to it a universal joint 18 with a splined stub 20 which is received by and mates with a splined axial bore 22 defined by the p/m rotor shaft 10 at an end opposite the differential. The reversible, variable displacement p/m has a rotating cylinder block 24 disposed in a low pressure fluid chamber 25 defined by the housing. The cylinder block is affixed to the p/m rotor shaft 10, such that whenever the rotor shaft is turning the cylinder block is also turning. The p/m rotor shaft is in effect a segment of the drive shaft. The cylinder block defines a plurality of cylinder bores 28 in which are disposed a plurality of pistons 30. The pistons are affixed by ball joints 32 to a swash plate 26. The swash plate is rotatingly held by a variable pitch yoke 34 which has a pair of oppositely and colinearly disposed pintles journaled in the housing 6. The pitch of the yoke is changed by rotating the yoke on its pintles. The pitch of the yoke is controlled by a lever 38 affixed to one of the yoke pintles 36. The lever 38 is linked to the vehicle accelerator pedal by a cable and an accelerator-side actuator 40A and is also linked to the brake pedal by a cable and a brake-side actuator 40B (see FIG. 14). The lever linked to the accelerator-side and brake-side actuators are the means by which the p/m is put into its motor mode or its pump mode. (The modes of the p/m refer to the action of the p/m when the vehicle, is operated in a forward motion. When it is operated in reverse motion, the accumulator is bypassed and the p/m is unloaded as will be explained.) Hydraulic oil fills the low pressure chamber 25, and the p/m is lubricated by the hydraulic oil in the low pressure chamber. When the drive shaft 16 turns, the cylinder block and swash plate rotate on bearings (not shown). Hydraulic fluid is communicated to and from the piston cylinders 28 through a pair of inlet/outlet ports, 42A and 42B, defined by an end plate 44. The ports, 42A and 42B, align with a corresponding pair of arcuate slots, 43A and 43B, defined by an inlet/outlet plate 46. The arcuate slots each extend slightly less than 180 degrees and the line of the pintles lies in an imaginary plane splitting the gaps between the slots. The rotor shaft turns on ball bearings 47A and 47B and the housing is fluid sealed by seals 48A and 48B. The housing also defines a pair of chamber inlet/outlet ports 50A and 50B. As will be explained, the arcuate slot 43B and end plate port 42B represent a low pressure "side" of the p/m whereas the arcuate slot 43A and end plate port 42A represent a high pressure "side" of the p/m.

With the lever 38 centered, the swash plate is normal to the p/m shaft which makes the pistons stationary in the cylinders, that is, they are not reciprocating. When the lever is moved forward (towards the front of the vehicle) the swash plate is no longer normal to the shaft and the pistons pump fluid from one end plate port and discharge it out the other end plate port, depending on the rotation. Tilting the lever the opposite way reverses flow even though rotation is the same.

The above description is typical of pumps already in production. However, it is novel and unique to mount it onto a differential, and in this manner adapt it to perform several functions without interfering with the normal operation of the vehicle. There is no need to engage or disengage the p/m as its rotor shaft and cylinder block are always turning whenever the vehicle is in motion. The lever and valves (discussed later) control all aspects of loading and unloading the p/m for both acceleration and braking modes.

This design also allows for the hydraulic p/m to be mounted to the differential by way of a reduction gear for applications where a pump with a higher RPM than an in-line pump can achieve is needed. This still makes the pump direct drive and self-governing and no changes in the design of the control system or the hydraulic piping are necessary.

Figure 3:
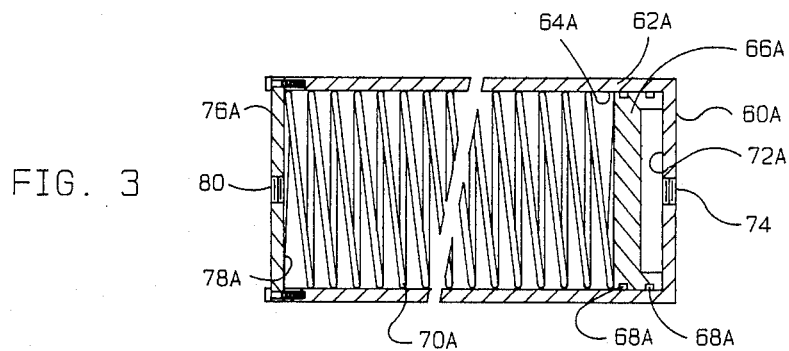
FIG. 3 is a partial section of a first embodiment of a pressure accumulator.
Figure 4:
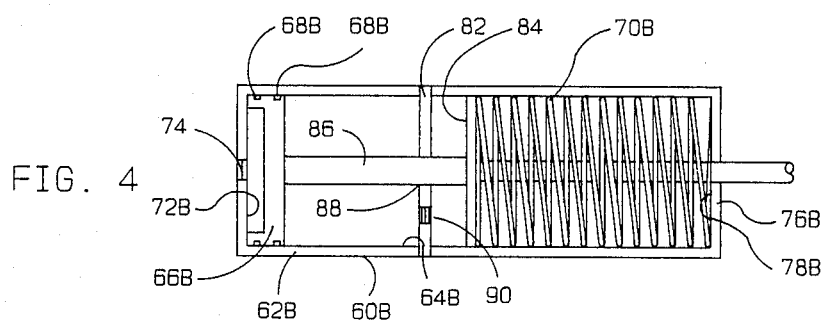
FIG. 4 is a partial section of a second embodiment of a pressure accumulator.
Figure 7:
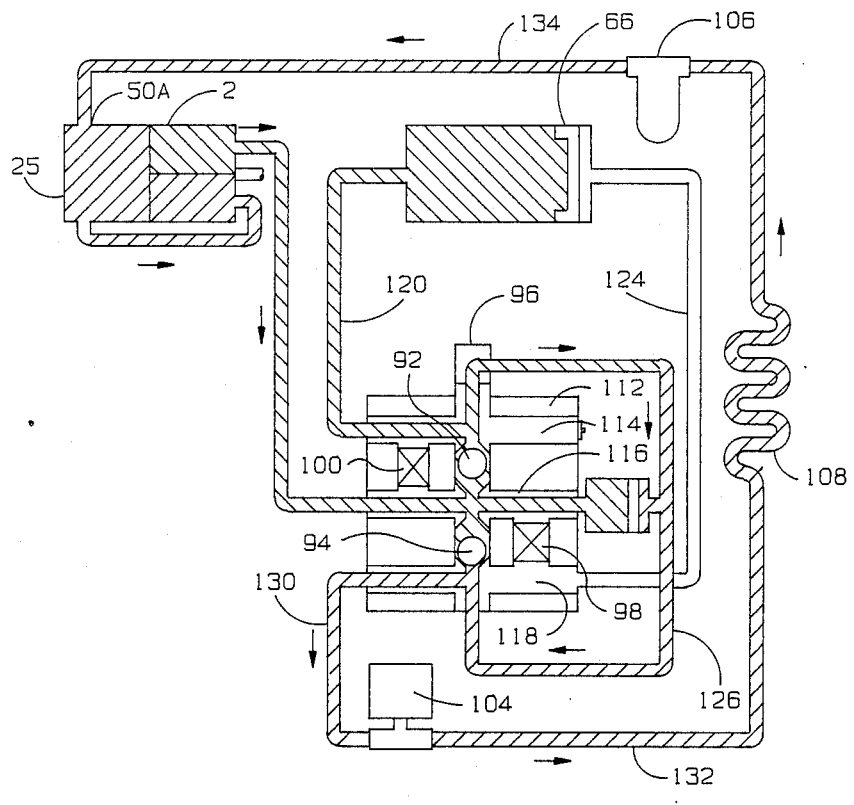

FIGS. 3 and 4 depict two novel embodiments of a spring-loaded pressure accumulator, 60A and 60B, used in this invention to store energy from deceleration of a vehicle to be subsequently used to accelerate the vehicle. Both accumulators comprise a housing, 62A and 62B respectively, defining a cylindrical piston bore, 64A and 64B respectively, a piston, 66A and 66B respectively, piston rings, 68A and 68B respectively, to prevent passage of fluid between the piston and the bore wa a spring (helical or belville), 70A and 70B respectively, biasing the piston, that is, urging the piston head against the housing which closes a fore end, 72A and 72B respectively, of the piston bore, a first hydraulic port 74 defined by the housing at the fore end of the bore and in fluid communication with the fore end of the bore, and an end plate, 76A and 76B respectively, which closes an aft end, 78A and 78B respectively, of the piston bore, the spring, 70A and 70B respectively, being disposed in the bore and pushing off the end plate. In FIG. 3, the first embodiment also comprises a second hydraulic port 80 defined by the end plate 76A and in fluid communication with the aft end 78A of the bore. In FIG. 4 the second embodiment also comprises a fluid containment wall 82 intermediate the aft and fore ends of the piston bore which transversely bifurcates the bore into fluid and non-fluid sections, the spring 70B being disposed in the non-fluid section and bearing against a flange 84 at an end of a piston rod 86, the other end of which is affixed to the piston 66B. The piston rod 86 slidingly extends through a fluid sealed aperture 88 defined by the fluid containment wall 82. The second embodiment also comprises a second hydraulic port 90 defined by the fluid containment wall and if fluid communication with the fluid section of the bore aft of the piston. Both embodiments have two separate fluid chambers, one fore of the piston and one aft of the piston. The aft fluid chamber serves as a low pressure fluid reservoir in combination with the low pressure chamber of the p/m. In the first embodiment, the spring is in the aft fluid chamber, whereas in the second embodiment the spring is external to both fluid chambers. When in deceleration mode, the p/m pumps oil from the aft fluid chamber and discharges it into the fore fluid chamber. When in acceleration mode, spring pressure on hydraulic fluid is the motive force and the fluid is the medium by which this force is transmitted to the hydraulic p/m and the wheels of the vehicle.

Figure 16:
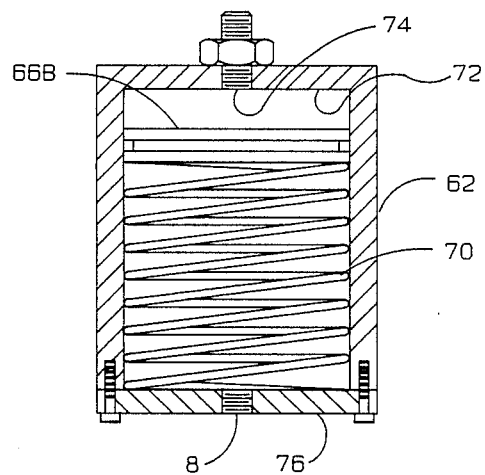
FIG. 16 is a partial sectional view of a pressure accumulator acting as an hydraulic "shock absorber".
Figure 11:
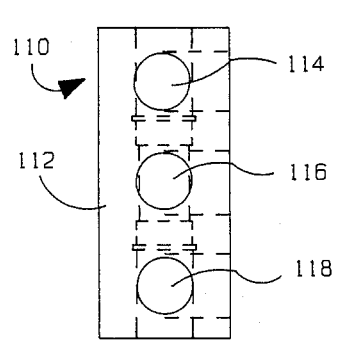
FIG. 11 is an end view of a manifold.
Figure 12:
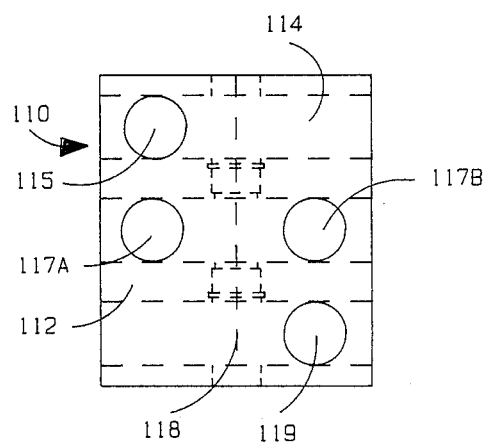
FIG. 12 is a front view of a manifold.

FIGS. 6–10 depict the piping system and control valves. The system consists of hydraulic lines, a first and a second check valves, 92 and 94 respectively, one pressure relief valve 96, one reverse valve 98 which is a first solenoid operated valve, one acceleration control valve 100 which is a second solenoid operated valve, one hydraulic "shock absorber" 102, a gas charged accumulator 104, an oil filter 106 and an air-cooled heat exchanger 108. The shock absorber 102 can be a miniature pressure accumulator as shown in FIG. 16. Its purpose is to prevent hydraulic locking of wheels at very slow speeds and to smooth the braking action when brakes are applied. The shock absorber, the two check valves, the relief valve, the acceleration and reverse valves are all mounted on a manifold 110 (FIGS. 11 and 12) which in turn is mounted on the pressure accumulator to simplify the piping and to save space.

The manifold comprises a body 112 which defines a first, second and third channels, 114, 116 and 118 respectively. The first channel 114 is in fluid communication with the fore fluid chamber of accumulator such as the accumulator 60 shown in FIG. 3 through port 74 via an hydraulic line 120, and also communicates with the relief valve 96, the first accumulator check valve 92, and the acceleration valve 100. The second channel 116 communicates with an opposite side of the accumulator check valve 92, with a fore chamber of the shock absorber 102, with the low pressure check valve 94, with the reverse valve 98, with the acceleration valve 100, and with a high pressure side of the p/m via an hydraulic line 122. The third channel 118 communicates with the low pressure check valve 94, with the reverse valve 98, with the aft fluid chamber of the accumulator via an hydraulic line 124, with the relief valve via an hydraulic line 126, with an aft fluid chamber of the shock absorber 102 via an hydraulic line 128, and the p/m low pressure chamber 25 through an hydraulic circuit comprising an hydraulic line 130 in series with the gas charged accumulator 104 in series with an hydraulic line 132 in series with the heat exchanger 108 and the oil filter 106 in series with an hydraulic line 134.

Figure 5:
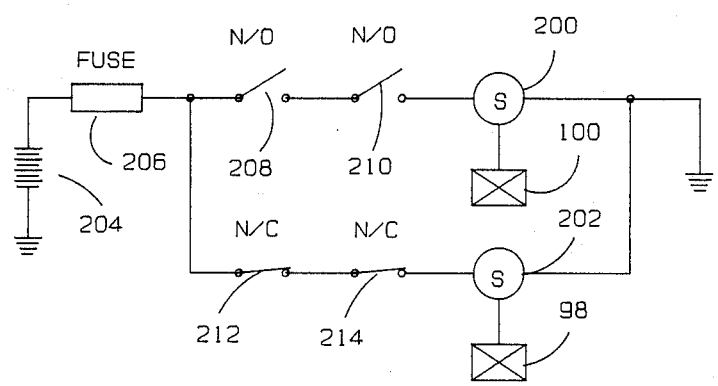
FIG. 5 is a schematic of an energizing circuit for an acceleration and a reverse solenoid valves.

Referring to FIG. 5, a schematic of the energizing circuit for the acceleration valve 100 and the reverse valve 98 is shown. Both fluid valves are controlled by solenoids, 200 and 202 respectively. The acceleration valve solenoid 200 is energized by power source 204 through a safety fuse 206 whenever normally-open (N/0) switches 208 and 210 are closed. Switch 208 becomes closed whenever the accelerator pedal is pushed via suitable linkage. Switch 210 becomes closed via suitable linkage whenever the vehicle is in any forward gear. Thus the normally closed accelerator valve 100 opens only when the vehicle is in a forward gear and the accelerator pedal is pushed. The reverse valve solenoid is normally energized by power source 204 through fuse 206 but becomes de-energized whenever either normally-closed (N/C) switch 212 or normally-closed switch 214 is opened. Switch 212 is opened by suitable linkage whenever the vehicle is in a reverse gear, and switch 214 is opened by suitable linkage whenever the hydraulic line pressure exceeds a certain threshhold.

When the vehicle is braking (see FIG. 6), the lever on the hydraulic p/m is moved forward causing oil to be pumped through line 122 to the manifold and into the shock absorber 102 (the spring is compressed fully and held there by the hydraulic pressure), fluid behind the shock absorber piston exits a back port into the low pressure line 126. The acceleration valve 100 is shut and the check valve 94 is forced shut. In this fashion the fluid pushes open check-valve 92 and is forced into the fore chamber of the pressure accumulator 60 because it cannot get through the accelerator valve or lift the relief valve 96. The accumulator piston 66 is forced against the accumulator spring, compressing the spring more and more as pressure is accumulated, i.e. as the accumulator becomes more and more charged. The fluid in the aft chamber of the accumulator is being pumped out via hydraulic port 80 by the hydraulic p/m. FIG. 6 illustrates the path which the accumulator 60 is charged to be from the high pressure side of the p/m via port 42A, through line 122 into the second manifold channel 116, through the open valve 92, out of the manifold via the first manifold channel 114, through the line 120, and into the fore chamber of the accumulator via port 74. If the spring becomes fully compressed, i.e. the accumulator becomes fully charged (FIG. 7), the accumulated pressure goes beyond the threshhold of the relief valve 96. The relief valve then lifts to bleed-off fluid to relieve the excess pressure and to open a first fluid bypass path through which the bled-off fluid returns to and circulates, or recycles, through the p/m. The path is from the relief valve through line 126 to line 130 and through lines 132 and 134 into the low pressure chamber 25 of the p/m via port 50A. At this stage, there is still a braking effect but the system is no longer storing energy. The vehicle will remain in brake mode as long as the lever remains forward. The further the arm is forward tilted, the greater the braking action. When the lever is straight up, it is neutral, and when it is titled backwards, it is in acceleration mode.

Figure 8:
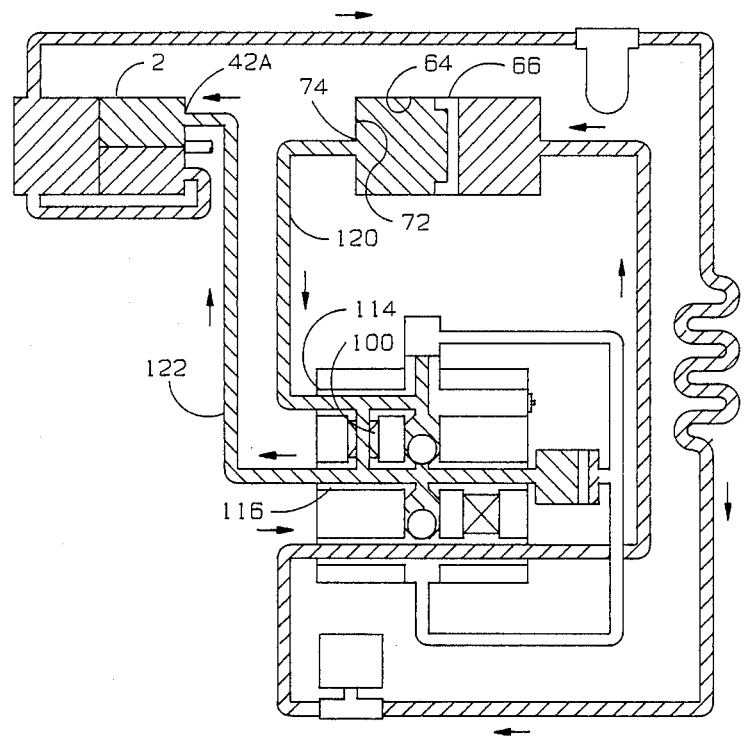
Figure 9:
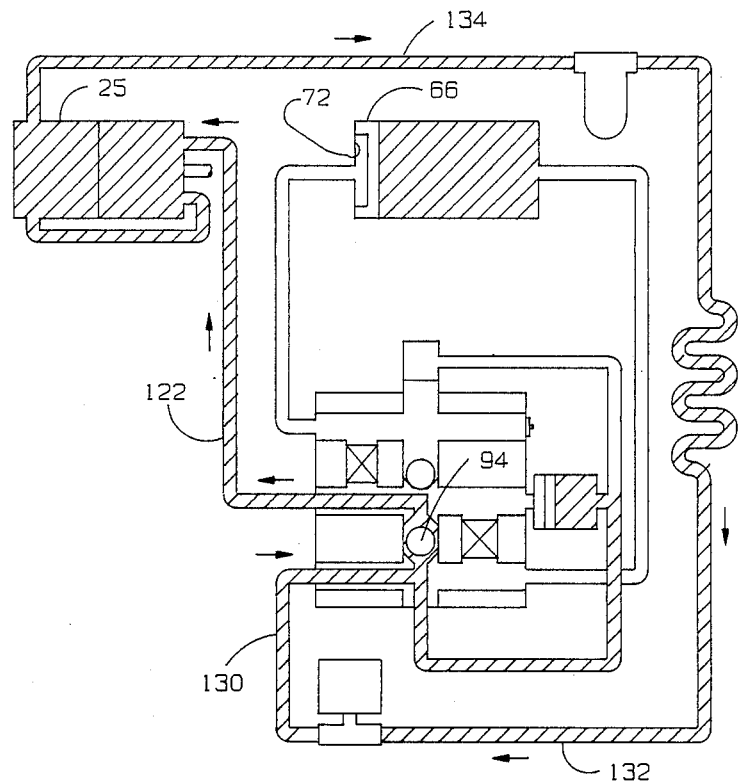

When the vehicle is stopped and acceleration is desired, removing a foot from the brake pedal returns the lever to a vertical position. Check valve 92 is held shut by the accumulator pressure. Until the vehicle is in a drive gear and the accelerator pedal is pressed, the acceleration valve 100 remains closed allowing the vehicle to operate in Park, Neutral, and Reverse operation. Once in drive (FIG. 8), pressing the accelerator opens the accelerator valve 100 and tilts the lever 38 backwards. The fluid pressure on the p/m pistons 30 urges rotation of the p/m cylinder block and thereby drives the vehicle forward until the piston 66 in the hydraulic pressure accumulator abuts the fore end 72 of the accumulator bore 64 and bottoms out, i. e. the accumulator becomes fully discharged. The engine continues to turn the cylinder block. FIG 8 illustrates the discharge path of the accumulator 60 to be from the fore chamber of the accumulator via port 74 into and through line 120, into the first manifold channel 114, through the open acceleration valve 100 into the second manifold channel 116, out said second channel into line 122, through line 122 and into the high pressure side of the p/m via port 42A. At this point, (figure 9) fluid is no longer being supplied to the p/m by the fore chamber of the accumulator even though the p/m is still in motor mode and the high pressure side of the p/m becomes a suction side felt through line 122, and check valve 94 opens a second fluid bypass path allowing the fluid to circulate through the p/m and by-pass the accumulator, thereby unloading the pump. The path is from the low pressure chamber 25 of the p/m, through lines 134, 132, and 130, into the manifold, through the open valve 94, and back to the p/m again through line 122.

Figure 10:
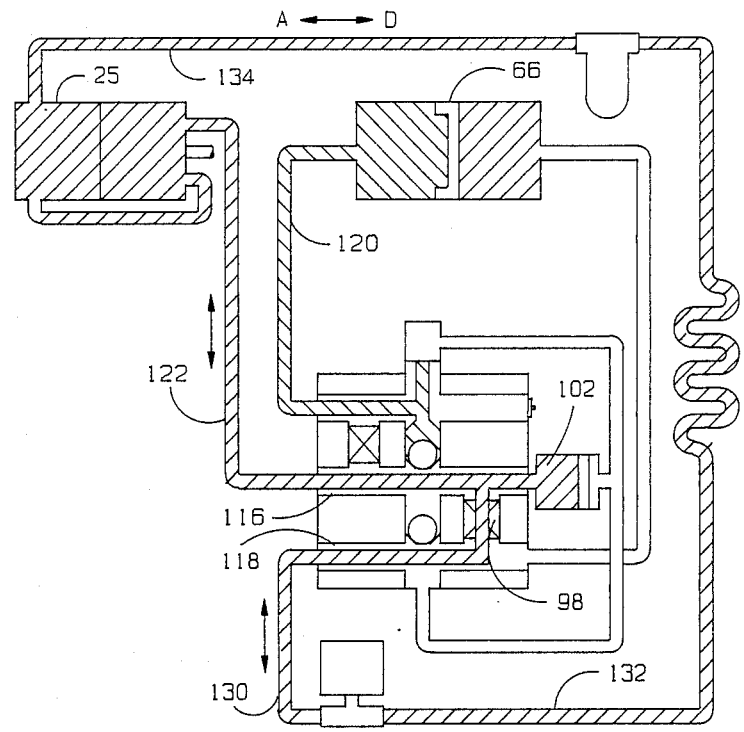

When the vehicle is placed in Reverse, (FIG. 10) reverse valve 98 opens up a third fluid bypass path allowing the fluid again to circulate through the high pressure and low pressure lines. FIG. 10 illustrates the fluid bypass path to be a circuit starting at the p/m port 42A and traversing through line 122, through the second manifold channel 116, through the open reverse valve 98, through the third manifold channel 118, through lines 130, 132, 134 and back to the p/m again. (Note that this system is failsafe because the reverse valve 98 opens when its de-energized. The reason for this is that reversing the rotation of the pump reverses the way the lever controls the flow. Therefore, acceleration causes the hydraulic motor to pump as in braking mode. The reverse valve is the means to unload the hydraulic motor so it will turn freely and allow the engine to drive the wheels without overcoming braking action. When the brake is pressed the flow is reversed (as in acceleration in a forward gear) and since the reverse valve is still open, fluid recycles in the opposite direction through the same lines. Braking while in reverse is accomplished through the vehicle's conventional brakes system.

The accelerator valve 100 and the check valve 92 work in combination to hold a charge in the accumulator at the appropriate times. They are both disposed in parallel in the charge/discharge fluid path between the p/m and the accumulator. The charge/discharge path is line 122 from the p/m into the second manifold channel 116, through either the accelerator valve 100 or the check valve 92, out of the manifold through the first manifold channel 114, and through line 120. The accelerator valve opens only when the accumulator is being discharged, and the check valve 92 opens only when the accumulator is being charged. As illustrated in FIG. 10, they remain closed whenever there is a charge in the accumulator and the vehicle is being operated in reverse or neither the accelerator pedal nor the brake pedal is being pushed.

The braking capacity is controlled by the volume of the pressure accumulator, the displacement of the hydraulic p/m, and the type, size, and number of springs behind the accumulators piston. In the case of economy cars, everything can be small unless the vehicle is engaged in climbing high grades. In such a case a greater capacity is desired. This capability is having enough storage area to allow coasting on the hydraulic pump down mountain type grades so that on most grades, the storage capability is not exceeded. Going uphill, much of the work can then be done by the hydraulic motor. In the case of small cars a larger volume pressure accumulator with a stronger spring can be installed. In the case of trucks, five or six or more pressure accumulators would be needed with belville springs and having huge volumes. This would, of course, add weight to the vehicle, but since the hydraulic p/m would be direct drive capable of an additional 100 horsepower or more, the truck could cruise uphill on hydraulic power alone-slowly or use the engine in tandem and approach freeway speeds. Downhill speeds could be at freeway speeds, because the brakes would never heat up and could remain on at all times (e.g. by a cruise control). Additional braking action and power storage could be accomplished by installing differential-hydraulic pump assemblies on each axle (instead of fixed axles) of the trailers and connecting pump-suction and discharge to the main system. The system could also be "charged" hooking up to an electrical driven hydraulic pump to load the springs before and during truck trips, which would be cheaper and save additional time in mountain areas. The use of gas charged hydraulic accumulators with separate reservoirs where space is available is preferable to spring loaded pressure accumulator/reservoirs. They can deliver higher pressure and large ones would be cheaper than making the combination accumulators. Also, instead of putting multiple hydraulic accumulators on a truck, one combination pressure cylinder reservoir could be used for normal braking and a manually or automatically operated throttling-type valve could be mounted at the high pressure outlet of the pump and the truck could coast downhill at a higher speed on the pump. No energy would be stored as the relief valve would lift and the fluid just circulate in the system, but it would save time and be much cheaper than the expense of additional hydraulic accumulators.

The following paragraphs deal with the description of the p/m mode control system of this invention. Operating this system requires that the conventional control cable or rod operating the vehicle carburetor or other fuel supply device (not shown) be adapted (i.e. slotting) or adjusted so that the first half-inch travel of the accelerator pedal will only operate the hydraulic p/m, and also requires that the brakes be adjusted so that free travel in the brake pedal is approximately three-quarters of an inch. This is to provide maximum braking by the hydraulic p/m at the first half-inch of travel without being impaired by the conventional brakes absorbing and wasting energy except in an emergency braking situation. These dimensions can be varied to suit each application, but whatever pedal travel is desired for the operation of the hydraulic p/m, the appropriate adjustments can and must be made in the conventional system to allow the hydraulic p/m to operate independently when desired.

Figure 15:
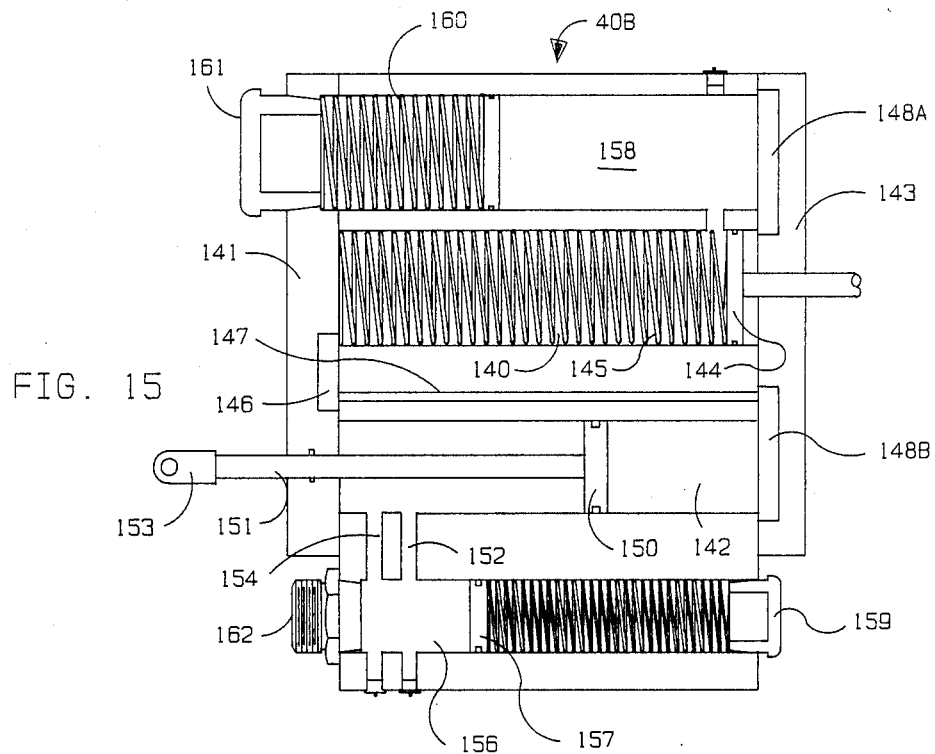
FIG. 15 is a sectional view of a lever actuator.
Figure 14:
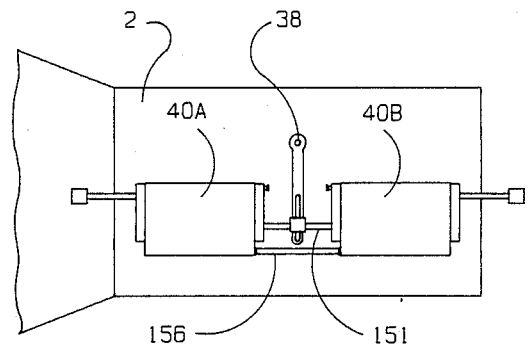
FIG. 14 is a front view of the lever and actuators of FIG. 13 in their neutral position.
Figure 13:
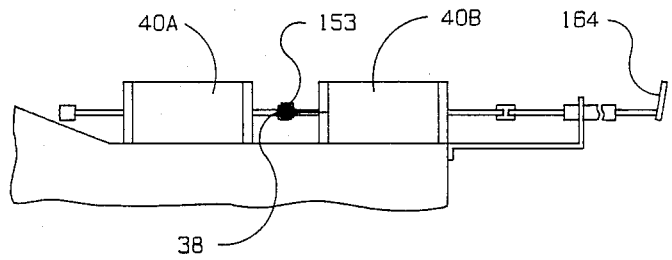
FIG. 13 is a plan view of a lever and actuators as they are affixed to a side of the hydraulic p/m.

Referring to FIGS. 13-15, the control of the lever 38 is accomplished by the two hydraulic fluid actuators, 40B and 40A, linked with the brake and accelerator pedals, respectively. The actuators are shown in their neutral position: there is no tilt to the lever 38. Each actuator has three different spring loaded cylinders 140, 156 and 158 which allow the brake pedal 164 and the accelerator pedal (not shown) to be operated independently of each other and still allow for continued brake and accelerator pedal travel after the lever 38 is fully operated in either direction. The following description is for the brake pedal actuator 40B, but the accelerator pedal actuator 40A is the same and its operation is the same but pushes the lever in the opposite direction.

Referring to FIG. 15, the brake pedal actuator 40B of FIG. 14 is shown to have a housing comprised of a block defining four major through-bores which are the cylinders 140, 142, 156, and 158, and a minor through-bore 147. These bores are capped at both ends by end plates 141 and 143. The master cylinder 140 has therein a biasing spring 145 which urges a master piston 144 against end plate 143 in which position the brake pedal 164 is fully out, i.e. not being pushed by the operator.

A slave cylinder 142 has therein a piston 150 which is linked to the lever 38 by rod 151 and clevis 153. The rod 151 travels reciprocatingly through end plate 141 in a fluid-tight bore defined by said end plate. The slave cylinder forward of the piston 150 is in fluid communication with the master cylinder by means of slots 146 and 148B defined by end plates 141 and 143, respectively, and the minor bore 147. The piston 150 has fluid-tight ring means which prevents fluid communication past the piston. The slave cylinder of the brake pedal actuator aft of its piston 150 is in fluid communication with the slave cylinder of the accelerator pedal actuator 40A aft of its respective piston 150 by means of a crossover fluid line 156. The crossover line 156 connects with fittings 162 which in turn communicate with the respective third cylinders 156. The cylinders 156 communicate with their respective slave cylinders by means of transverse bores 152 and 154.

The third cylinder 156 has disposed therein a piston 157 with fluid-tight ring means. The portion of the third cylinder aft of the piston is vented to air by a vent means 159, and it contains a baising spring urging the piston in a direction away from the vent and toward the transverse bore 154.

The fourth cylinder 158 is in fluid communication with the master cylinder by means of a slot 148A defined by the end plate 143 and by a transverse bore 163. A piston 160 with fluid-tight ring means is disposed in the fourth cylinder. The portion of the fourth cylinder aft of the piston is vented to air by a vent means 161, and it contains a biasing spring urging the piston in a direction away from the vent and toward the transverse bore 163.

In operation, a first volume of hydraulic fluid is transferred among and between the master cylinder 140, the slave cylinder 142 forward of the slave piston 150, and the third cylinder 158 forward of its piston 160. A second volume of hydraulic fluid is transferred among and between the slave cylinder aft of the slave piston, the third cylinder 156 forward of its piston 157, and the second volume is also transferred back and forth between the actuators, 40A and 40B, via the crossover line 156. At a point when a slave piston 150 has been pushed backward past its port 152, the first volume of fluid in that actuator communicates with the second volume of fluid.

The first half-inch of brake pedal 164 travel operates the lever 38 through its entire arc of travel. During this first part of brake pedal movement, master cylinder piston 144 is pushed away from end plate 143 and into the master cylinder against the biasing spring 145. This puts hydraulic pressure on the slave piston 150 and operates the smaller slave piston through its full backward travel. The fluid on the spring side of the master piston 144 exits through slot 146, minor throughbore 147, and slot 148B, and into the slave cylinder 142 and pushes the piston 150 to the rear of its cylinder. The fluid aft the slave piston exits under pressure via the two ports 152 and 154, and it goes into both the brake actuator and accelerator actuator third cylinders and the accelerator slave cylinder aft of its piston. When the slave piston is fully depressed, that is, pushed past its port 152 (maximum lever tilt), the fluid in the slave cylinder forward of the piston is released into the third cylinders 156 which act as overflow accumulators, both cylinders 156 taking up the additional fluid. This allows the brake pedal to fully depress without moving the lever any further. Since the accelerator pedal is not depressed when braking, the fluid urges the accelerator actuator slave piston to its forward end of travel. The spring biased pistons 157 act to keep the fluid under pressure and free of air pockets.

When the accelerator pedal is depressed, the brake actuator slave piston is forced by the accelerator actuator slave piston towards its fluid inlet 148B, and it forces fluid to flow into cylinder 158 through the master cylinder 140 and compresses the spring biased piston 160. When neither the brake pedal nor the accelerator pedal are depressed, all springs compliment each other in that the actuators return the lever and pistons to neutral position.

This braking system can be designed for any weight vehicle. As the pump (motor) is driven by the wheels it is self-governing, as the wheels slow down, the pump slows down keeping the amounts of braking action per wheel revolution constant and therefore no danger of the wheels locking as the vehicle slows.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. In a vehicle self-propelled by an engine whose propelling force is transmitted through an axially rotating drive shaft, said vehicle also having an acceleration control means and a braking control means, a system for converting and storing at least a portion of the kinetic energy lost to the vehicle when it is braking and applying the stored energy to re-accelerate the vehicle, the system comprising:

(a) a variable displacement hydraulic pump/motor having a rotor concentrically affixed to a segment of the drive shaft, the pump/motor having selectable pump and motor modes, (b) a fluid reservoir means containing fluid under low pressure from which the pump/motor can draw fluid when it is in pump mode and into which it can discharge fluid when it is in motor mode, (c) an hydraulic pressure accumulator in fluid communication with the pump/motor through a charge and discharge path, the accumulator being charged by accumulating pressure when the pump motor is in its pump mode, and the accumulator being discharged by releasing its accumulated pressure into the pump/motor when the pump/motor is in its motor mode, (d) means in fluid communication with the charge path between the pump/motor and the accumulator for opening a fluid path when the pump/motor is in pump mode and the accumulated pressure goes beyond a threshold of said means in fluid communication with the charge path between the pump/motor and the accumulator, the opened fluid path being operable to bleed fluid from the accumulator when an accumulator charge is in excess of said threshold and return the fluid bled from the accumulator to the pump/motor for recirculating through the pump/motor to keep it loaded, (e) a first means in fluid communication with the pump/motor for unloading the pump/motor when the pump/motor is in motor mode and the accumulator is fully discharged, the first pump/motor unloading means opening a fluid path enabling the pump/motor to be substantially unloaded, (f) a second means in fluid communication with the pump/motor for unloading the pump/motor when the vehicle is being operated in reverse, the second pump/motor unloading means opening a fluid path enabling the pump/motor to be substantially unloaded, (g) means disposed in the charge and discharge path between the pump/motor and the accumulator for holding a charge in the accumulator whenever the vehicle is being operated in reverse, or whenever neither the acceleration control means nor the braking control means are actuated, (h) means for putting the pump/motor in its pump mode whenever the braking control means is actuated and the vehicle is moving forward, and (i) means for putting the pump/motor in its motor mode whenever the acceleration control means is actuated and the vehicle is moving forward.

2. The system of claim 1 wherein the hydraulic pressure accumulator comprises:

(a) a housing defining a piston cylinder chamber, (b) a piston adapted to reciprocate within the cylinder chamber, the piston dividing the cylinder chamber into a variable fore chamber defined by a head of the piston and the cylinder chamber forward of the piston, and an aft chamber defined by a base of the piston and the cylinder chamber aft of the piston, (c) a spring biasing means urging the piston to minimize the volume of the fore chamber.

3. The system of claim 2 wherein the fluid reservoir means comprises the combination of:

(a) the aft chamber of the accumulator, (b) a low pressure chamber defined by the pump/motor cylinder block and housing, and (c) a low pressure fluid path between and in communication with the aft chamber of the accumulator and the low pressure chamber of the pump/motor.

4. The system of claim 3 wherein the means in fluid communication with the charge path between the pump/motor and the accumulator for opening a fluid path when the pump/motor is in pump mode and the accumulated pressure goes beyond a threshold comprises a pressure relief valve disposed in a first fluid bypass path, a first end of said first fluid bypass path communicating with the charge and discharge path and the opposite end of the first fluid bypass path communicating with the low pressure path.

5. The system of claim 3 wherein the first means in fluid communication with the pump/motor for unloading the pump/motor when the pump/motor is in motor mode and the accumulator is fully discharged comprises a check valve disposed in a second fluid bypass path, a first end of said second fluid bypass path communicating with the charge and discharge path and an opposite end of the second fluid bypass path communicating with the low pressure path.

6. The system of claim 3 wherein the second means in fluid communication with the pump/motor for unloading the pump/motor when the vehicle is being operated in reverse comprises a solenoid operated valve in a third fluid bypass path, one end of said third fluid bypass path being in communication with the charge and discharge path and the opposite end of the third fluid bypass path being in communication with the low pressure path.

7. The system of claim 3 further comprising two parallel branches in the charge and discharge path between the pump/motor and the accumulator and wherein the charge holding means comprises a first valve means for opening one of said parallel branches only in response to actuation of the acceleration control means in order to allow the accumulator to discharge into the pump/motor during vehicle acceleration, and a second valve means for checking the flow of fluid through the other of said parallel branches in order to hold a charge in the accumulator when the first valve means is closed and the pump/motor is not in pump mode.

8. In a vehicle self-propelled by an engine whose propelling force is transmitted through an axially rotating shaft, said vehicle also having an acceleration control means and a braking control means, a system for converting and storing at least a portion of the kinetic energy lost to the vehicle when it is braking and applying the stored energy to re-accelerate the vehicle, the system comprising:

(a) a variable displacement hydraulic pump/motor having a rotor concentrically affixed to a segment of the shaft, the pump/motor having a selectable pump and motor modes;

(b) an hydraulic pressure accumulator in fluid communication with the pump/motor through a charge and discharge path, the accumulator being charged by accumulating pressure when the pump/motor is in its pump mode, and the accumulator being discharged by releasing its accumulated pressure into the pump/motor when the pump/motor is in its motor mode, said accumulator comprising:

(1) a housing defining a cylindrical chamber, (2) a reciprocating means movable in the cylindrical chamber for dividing the cylindrical chamber into a variable fore chamber defined by the reciprocating means and a portion of the cylindrical chamber forward of the reciprocating means, and an aft chamber defined by the reciprocating means and a portion of the cylindrical chamber aft of the reciprocating means, (3) a means for biasing the reciprocating means forward to minimize the volume of the fore chamber;

(c) a fluid reservoir means containing fluid under low pressure from which the pump/motor can draw fluid when it is in pump mode and into which it can discharge fluid when it is in motor mode, said fluid reservoir comprising:

(1) the aft chamber of the accumulator, (2) a low pressure chamber defined by the pump/motor cylinder block and housing, and (3) a low pressure fluid path between and in communication with the aft chamber of the accumulator and the low pressure chamber of the pump/motor;

(d) means in fluid communication with the charge and discharge path between the pump/motor and the accumulator for opening a fluid path when the pump/motor is in pump mode and the accumulated pressure goes beyond a threshold of said means in fluid communication with the charge and discharge path between the pump/motor and the accumulator, the opened fluid path being operable to bleed fluid from the accumulator when an accumulator charge in excess of said threshold and return the fluid bed from the accumulator to the pump/motor for recirculating through the pump/motor to keep it loaded, (e) a first means in fluid communication with the pump/motor for unloading the pump/motor when the pump/motor is in motor mode and the accumulator is fully discharged, said first means in fluid communication with the pump/motor for unloading the pump/motor opening a fluid path enabling the pump/motor to be substantially unloaded;

(f) a second means in fluid communication with the pump/motor for unloading the pump/motor when the vehicle is being operated in reverse, said second means in fluid communication with the pump/motor for unloading the pump/motor opening a fluid path enabling the pump/motor to be substantially unloaded;

(g) a means disposed in the charge and discharge path between the pump/motor and the accumulator for holding a charge in the accumulator whenever the vehicle is being operated in reverse or neither the acceleration control means nor the braking control means are actuated;

(h) means for putting the pump/motor in its pump mode whenever the braking control means is actuated and the vehicle is moving forward; and (i) means for putting the pump/motor in its motor mode whenever the acceleration control means is actuated and the vehicle is moving forward.

9. The system of claim 5 wherein the means said means in fluid communication with the charge and discharge path between the pump/motor and the accumulator for opening a fluid path when the pump/motor is in pump mode and the accumulated pressure goes beyond a threshold comprises a pressure relief valve disposed in a first fluid bypass path, a first end of said bypass path communicating with the charge and discharge path and the opposite end of the first fluid bypass path communicating with the low pressure path.

10. The system of claim 8, wherein the first means in fluid communication with the pump/motor for unloading the pump/motor when the pump/motor is in motor mode and the accumulator is fully discharged comprises a check valve disposed in a second fluid bypass path, a first end of said second fluid bypass path communicating with the charge and discharge path and an opposite end of the second fluid bypass path communicating with the low pressure path.

11. The system of claim 8 wherein the said second means in fluid communication with the pump/motor for unloading the pump/motor when the vehicle is being operated in reverse comprises a solenoid operated valve in a third fluid bypass path, one end of said third fluid bypass path being in communication with the charge and discharge path and the opposite end of the third fluid bypass path being in communication with the low pressure path.

12. The system of claim 8 further comprising two parallel branches in the charge and discharge path between the pump/motor and the accumulator and wherein the charge holding means comprises a first valve means for opening one of said parallel branches only in response to actuation of the acceleration control means in order to allow the accumulator to discharge into the pump/motor during vehicle acceleration, and a second valve means for checking the flow of fluid through the other of said parallel branches in order to hold a charge in the accumulator when the first valve means is closed and the pump/motor is not in pump mode.

* * * * *